United States Patent [19]
Lill

[11] 3,768,319
[45] Oct. 30, 1973

[54] STATOR WINDING APPARATUS
[75] Inventor: John F. Lill, Ft. Wayne, Ind.
[73] Assignee: Windamatic Systems, Inc., Ft. Wayne, Ind.
[22] Filed: Dec. 3, 1971
[21] Appl. No.: 204,652

[52] U.S. Cl. .................... 74/20, 242/1.1 R, 74/23
[51] Int. Cl. .......................................... F16h 21/00
[58] Field of Search ................................ 74/20, 23; 242/1.1 R

[56] References Cited
UNITED STATES PATENTS

| 2,569,679 | 10/1951 | Leece et al. | 242/1.1 R |
| 2,949,789 | 8/1960 | Eminger | 74/23 |
| 3,276,275 | 10/1966 | Ebbert | 74/23 |
| 3,678,766 | 7/1972 | Gerber | 74/23 |
| 818,058 | 4/1906 | Thode | 74/23 |
| 1,208,843 | 12/1916 | Schuyler | 74/23 |

Primary Examiner—Charles J. Myhre
Assistant Examiner—Wesley S. Ratliff, Jr.
Attorney—Maurice A. Weikart

[57] ABSTRACT

Disclosed is a stator winding apparatus utilizing a uniformly rotating crank member, a connecting rod attached to the crank member, a pivot support for the connecting rod permitting longitudinal sliding motion of the rod with respect to the pivot. A driven member mounted for rotation is connected to the rod by a pin and slot connection. The uniform velocity rotation of the crank is converted into intermittent, non-uniform velocity rotation of the driven member. Rotation of the driven member is utilized to provide the oscillating motion for the winding head without use of a barrel cam as heretofore thought necessary in the prior art.

15 Claims, 11 Drawing Figures

PATENTED OCT 30 1973 3,768,319
SHEET 1 OF 4

PATENTED OCT 30 1973 3,768,319

PATENTED OCT 30 1973 3,768,319

STATOR WINDING APPARATUS

BACKGROUND OF THE INVENTION

High speed stator winding apparatus conventionally includes a drive assembly actuated to move a wire dispensing winding head in a generally rectangular path to wind wire in the required pattern on the stator. This rectangular path of movement is obtained by sequentially applying a rotary motion (oscillation) and a reciprocating linear motion (stroke) to the winding head. Apparatus of the type referred to is disclosed in U.S. Pat. Nos. 2,847,170 and 2,949,789. Such prior art apparatus is characterized by use of a grooved barrel cam to obtain the required angular motion and dwell interval pattern for the oscillating, or transverse, motion of the winding head.

While use of a barrel cam simplifies somewhat the required coordination of the transverse angular motion of the winding head with means (conventionally a Scotch-yoke type drive) for producing the reciprocating linear stroke of the head, barrel cams and the attendant follower apparatus are characterized by relatively large mass (leading to acceleration and deceleration problems) and are subject to rapid wear. These are particularly undesirable characteristics in high operating speed apparatus.

The drive apparatus of the present invention specifically provides the required motion interrupted by periodic dwell intervals for the winding head. No high mass components, and no barrel cams are utilized, the drive assembly being thereby particularly adapted to high speed operation. While the drive assembly of the present invention is particularly suitable for use in stator winding apparatus, in a more general sense, the concept of the present invention provides a means for effectively converting continuous, uniform velocity rotary motion into intermittent, non-uniform velocity rotary motion and can be utilized wherever such motion conversion is necessary, in such apparatus as, for example, punch-press feed mechanisms, rotary indexing tables in machining or assembling operations, moving picture projections, etc.

DESCRIPTION OF THE PREFERRED EMBODIMENTS

Figure 1:
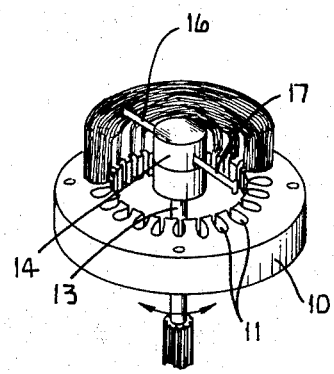
FIG. 1 is a fragmentary, perspective view of a stator having a winding placed upon it by a winding head.
Figure 2:
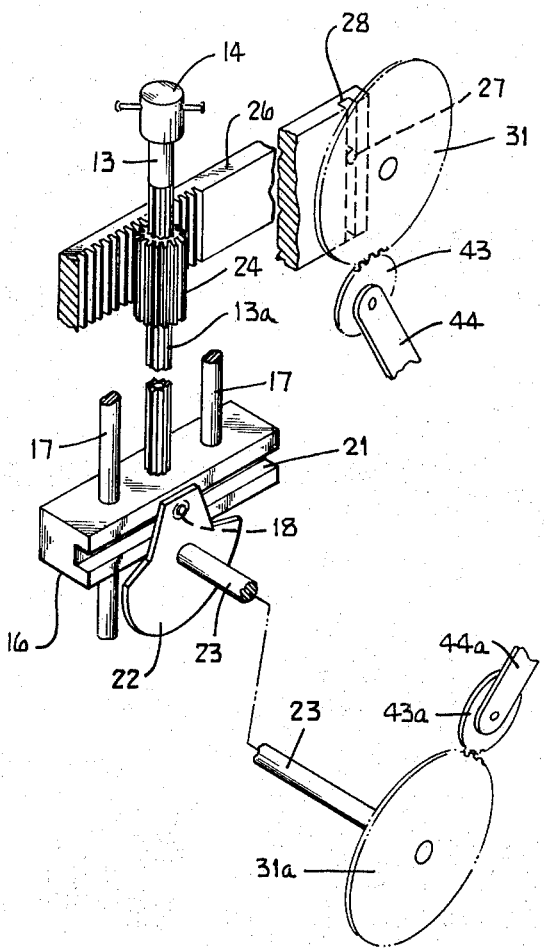
FIG. 2 is a fragmentary, schematic perspective view of a portion of the drive mechanism for the winding head.
Figure 3:
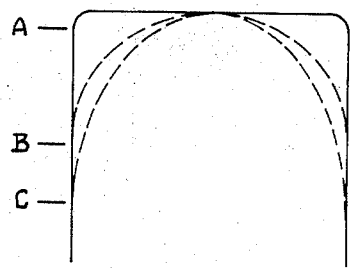
FIG. 3 illustrates a portion of the winding path or path of movement of the winding head when actuated by various forms of driving means.

Referring initially to FIGS. 1, 2 and 3 there is shown at 10 in FIG. 1 a stator having a central bore and multiple spaced radially extending slots 11 adapted to receive windings extending between slots 11. The windings may assume various lengths, this winding form being characteristic of stators having distributed windings. The stator is mounted in stationary fashion by means of mounting members (not shown) and extending through the central bore of the stator 10 is a hollow shaft 13 which, at its upper end, carries a winding head 14 which, in turn, mounts wire dispensing members 16 and 17. The shaft 13 is adapted to have threaded through its central, longitudinal bore lengths of wire which are applied to the stator slots 11 by the winding head 14. It will be understood that the wire extending from the winding head is drawn from suitable wire supply reels (not shown) as the winding operation progresses.

Referring to FIG. 2, the lower portion of the shaft 13 is splined as indicated at 13a and is secured to a vertically slidable head 6 which is guided by stationary guide rods 17. A roller member 18, carried by a crank member 22, fits within a groove 21 in the head 16. The crank member 22 is rotated by a shaft 23 which is driven by a gear 31a, to be described in further detail subsequently with reference to FIG. 4. Rotation of the shaft 23, through the linkage provided by the head 16, a Scotch-yoke type linkage, produces reciprocating vertical motion of the shaft 13 and consequently of the winding head 14.

The angular motion of the winding head, which must occur at each terminus of the vertical stroke of the head is provided by means of the internally splined pinion gear 24 which meshes with a cooperating rack 26. The splined portion 13a of the shaft 13 can move vertically with relation to the pinion gear 24, however, any angular or rotary motion imparted to the gear by linear, horizontal motion of the rack 26 results in angular, rotary motion of the head 14. The rack 26 is moved by means of the member 27 which extends into a slot 28 in the rack, the member 27 being carried by a gear 31, to be described subsequently with reference to FIG. 4. By means of the pin and slot connection between the gear 31 and the rack, the rack is given a linear, reciprocating motion which, through the pinion 24, serves to angularly move the winding head 14 about the longitudinal axis of the shaft 13.

From the foregoing, it will be apparent that with rotation of shaft 23, the shaft 13 will be given a reciprocating motion and consequently, the winding head 14 will be moved in a path parallel to the central axis of the bore of the stator 10. Further, at the limits of the reciprocating motion of the winding head 14 referred to above, through the rack 26, the shaft 13 will be given a rotational movement which consequently provides movement of the winding head 14 in a path transverse to the central axis of the bore of the stator 10. The structure schematically illustrated in FIG. 2 and described briefly above is generally conventional and the means for providing the coordinated motion and dwell intervals for both the transverse oscillating motion of the winding head and its stroke parallel to the axis of the shaft 13 carrying the winding head forms the subject matter of the present invention.

Referring to FIG. 3, there is shown the upper portion of the path of motion of the winding head, projected into the vertical plane. As will be evident from FIGS. 1 and 3, the transverse portion of the path can only occur after the winding head has travelled sufficiently through the vertical portion of its stroke so that the members 16 and 17, carried by the stator head are clear of the stator slots. It will be noted that the winding path indicated by the solid line in FIG. 3 has an almost rectangular configuration, the transition between vertical and horizontal motion of the winding head being very abrupt. This winding path permits maximum utilization of the travel of the winding head and permits laying down of the maximum number of coil turns on the stator for a given horizontal and vertical motion of the winding head. The maximum utilization of the dwell interval in the oscillating horizontal motion of the winding head is achieved as indicated by the height of the vertical stroke portion indicated at A. Because of the low mass characteristic and the excellent acceleration and deceleration characteristics of the drive assembly of the present invention, to be subsequently described, this ideal winding head path can be achieved, whereas it cannot be achieved by the conventional barrel cam and Scotch-yoke type of actuation for the winding head. Modified winding paths, indicated by broken lines in FIG. 3, and having dwell intervals in the horizontal, oscillating motion of the winding head measured by levels B and C, can also be achieved with the drive assembly of the present invention and such modified winding paths, being quite satisfactory for some stator winding applications, can be accomplished by utilizing the drive assembly of the present invention for the horizontal, angular motion of the winding head while retaining the conventional Scotch-yoke actuation of the vertical stroke motion of the winding head.

Figure 4:
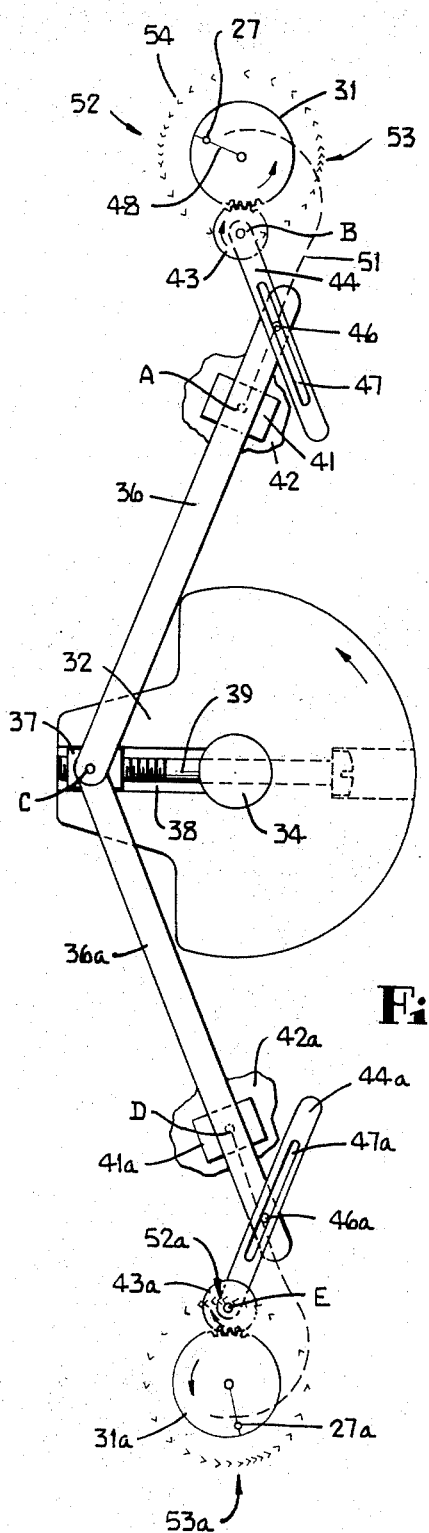
FIG. 4 is a schematic front view of a drive apparatus embodying the present invention.
Figure 7:
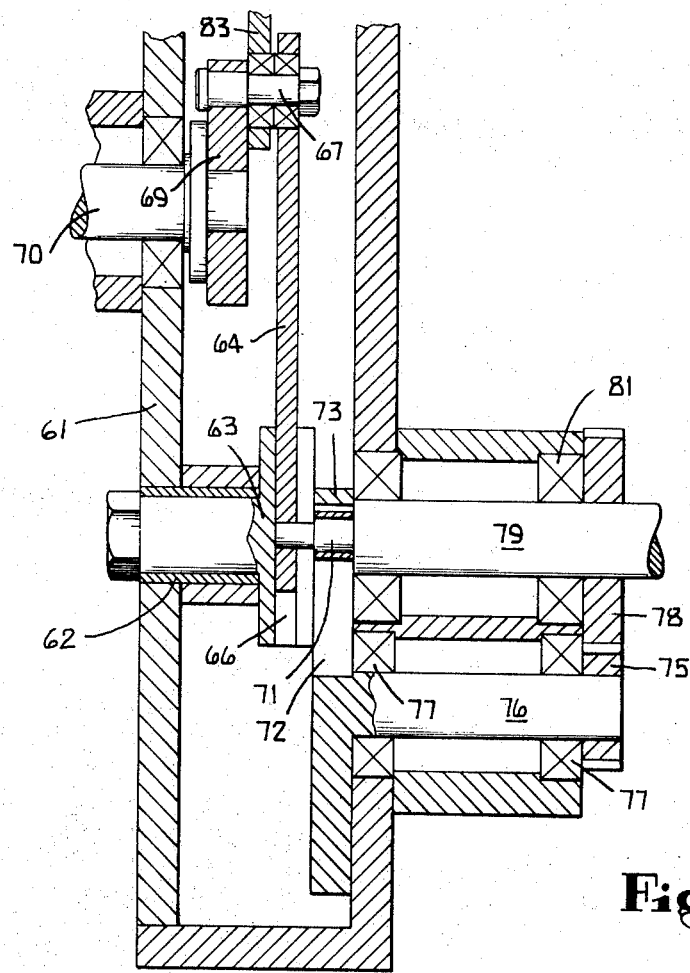
FIG. 7 is a side sectional view illustrating, fragmentarily, the practical adaptation of the apparatus shown schematically in FIG. 4.
Figure 8:
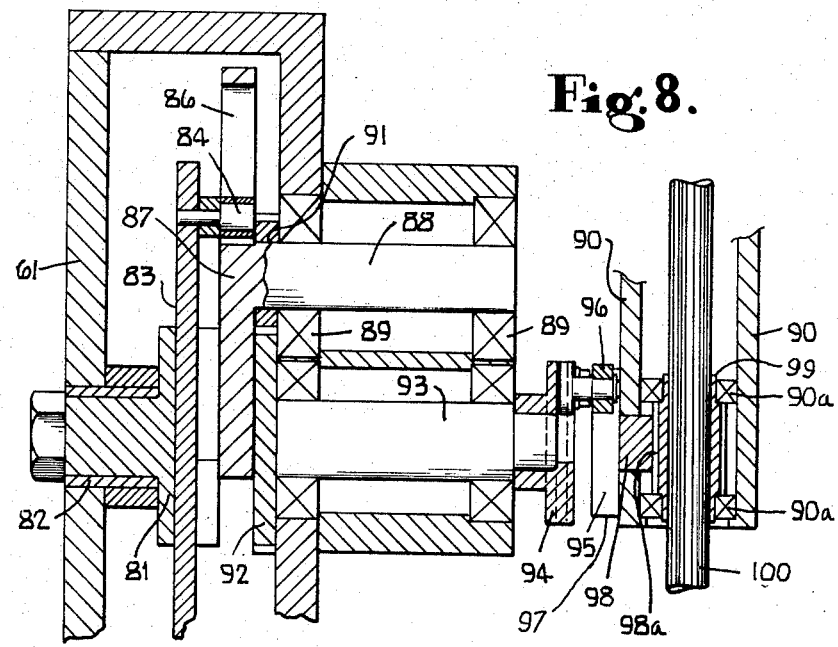
FIG. 8 is a view similar to FIG. 7 but showing a further portion of the apparatus illustrated in FIG. 7.

Referring to FIGS. 4, 9, 10 and 11, the apparatus for converting continuous, uniform velocity, rotary motion into intermittent, non-uniform velocity, rotary motion and embodying the present invention is schematically shown, a more practical embodiment of the same structure being also shown in FIGS. 7 and 8. In FIG. 4 a drive member, moved at uniform velocity through a circular path, takes the form of the drive crank, keyed to and rotated by drive shaft 34. A connecting rod 36 has a pivotal connection at C to the crank 32, the pivot pin C being carried by the block 37 which is movable within the radial slot 38 in the crank. An adjusting screw 39 extends diametrically through the crank and shaft 34 and is threaded into block 37 so that the throw of crank 32 with respect to connecting rod 36 can be varied by adjustment of screw 39.

An intermediate pivot axis for the rod 36 is established at A by the member 41 which is pivotally supported at A on the stationary support surface shown fragmentarily at 42. The member 41 is thus free to move angularly about pivot axis A but cannot otherwise shift its position. Member 41 is U-shaped in cross-section and centrally accommodates slidably within its bight the connecting rod 36. Since rod 36 is not connected to the pin defining pivot axis A, but is free to move longitudinally within the member 41, the arrangement permits relative motion of the rod and intermediate pivot axis A but the longitudinal axis of the rod must pass through pivot axis A at all of the angular positions of the rod assumed as crank 32 rotates.

A driven member, taking the form of gear 43 and rigidly attached arm 44, is supported for rotary motion about stationary rotational axis B. It will be understood that although arm 44 is rigidly attached to gear 43 the gear is free to rotate through 360° about axis B as arm 44 moved clockwise through 360°, about axis B however, the gear 43 cannot otherwise shift its position. An operative connection between the driven member (gear 43 and arm 44 collectively) and the rod 36 is established by the pin 46 which extends from rod 36 into the elongated slot 47 in arm 44. The slot and pin connection thus established permits both angular and linear relative movement between arm 44 and rod 36. Gear 31, previously identified in FIG. 2, meshes with gear 43 and is sized so that a two to one ratio exists between the two gears, gear 31 being driven through a single revolution for each two revolutions of gear 43. As previously pointed out, the gear 31 may carry a pin 27 which drives the rack 26, and as schematically illustrated at 48 in FIG. 4, the position of pin 27 along a radius of the gear, and thus the stroke length of the rack, may be adjusted by a sliding block and adjusting screw arrangement similar to that identified at 37 and 39 in FIG. 4.

Referring to the structure so far described with reference to FIG. 4, and ignoring temporarily the general identical structure extending to the lower part of FIG. 4, (which structure is omitted, for clarity, in FIGS. 9, 10 and 11) in operation, and keeping in mind that rod 36 may freely slide longitudinally within member 41, as crank 32 rotates counterclockwise from its position of FIG. 9 into its position of FIG. 4, rod 36 will be moved downwardly and angularly moved clockwise (as viewed in FIG. 9) causing clockwise rotation with decreasing velocity of the arm 44 and gear 43 from their position of FIG. 9 to their position of FIG. 4. The path of the center of pin 46 will be as indicated by broken line 51 in FIG. 4 and as crank rotation proceeds from the FIG. 4 position to the FIG. 10 position, the pin will move into overlying relation with pivot axis A when crank pivot C is in its lowermost position shown in FIG. 10, 90° beyond the position shown in FIG. 4. Further motion of crank 32 from its position of FIG. 10 to its position of FIG. 11 and then back to its position of FIG. 9 will cause the center of pin 46 to travel an upward path which is symmetrical with the portion of its path indicated at 51 in FIG. 4 but on the left hand side of gear 43. It will be evident that as the rod 36 and arm 44 move sequentially through their positions shown in FIGS. 9 and 4 to the FIG. 10 position in which pin 46 overlies pivot axis A, the rotation of gear 43 will smoothly decrease in velocity to an immobile condition, undergo a dwell interval, and as crank 32 moves upwardly from its lower dead center position of FIG. 10 toward its position of FIG. 11, the pin 46 will begin the ascending portion of its path and rotation of gear 43 will again proceed at smoothly increasing velocity. Gear 43 is thus rotated through one dwell interval for each complete rotation with smoothly decreasing velocity as the dwell interval is approached and smoothly accelerating motion after the dwell interval. It will be noted that the minimum velocity of dwell interval of gear 43 occurs upon alternate rectilinear alignments of the three points identified in FIG. 4 at C, A and pin 46, that is, only when carnk 32 moves pivot axis C through lower dead-center (FIG. 10).

Gear 31, rotating once to each two rotations of gear 43, will consequently exhibit two dwell intervals for each 360° of rotation. These dwell intervals will occur at diametrically opposite areas indicated in FIG. 4 generally at 52 and 53 and visually indicated by the shortened space between the V markings 54 grouped around the periphery of gear 31 to indicate the dwell intervals and motion of the gear, the distances between each marking indicating generally the distance travelled by a gear tooth in unit time. Referring to FIG. 2, it may be seen that with gear 31 linked to rack 26 through pin 27 and slot 28 the rack will be moved through its stroke and returned, with a dwell interval at each end of its stroke for each revolution of gear 31. Through pinion 24 this motion of the rack is translated into the reciprocating angular motion with a dwell interval at each limit of the oscillation which is required for the winding head 14. The longitudinal portion of the winding head path, whether produced by a counterpart of the structure just described or by any other linear motion producing means, occurs during the dwell intervals of the gear 31 and rack 26.

Figure 9:
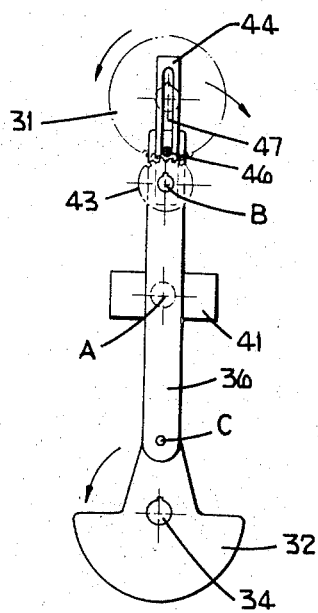
FIG. 9 is a schematic front view (omitting the lower duplicate structure for clarity) similar to FIG. 4 but illustrating the driving crank in a position preceding its position of FIG. 4.
Figure 10:
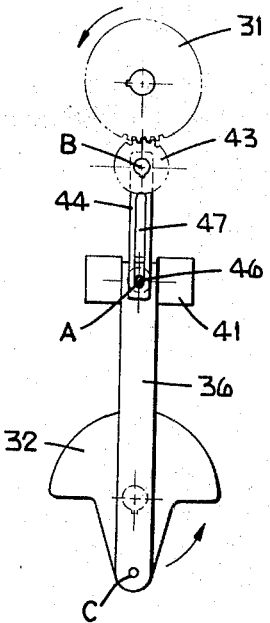
FIG. 10 is identical to FIG. 9 but illustrates the crank in a position subsequent to its position in FIG. 4.
Figure 11:
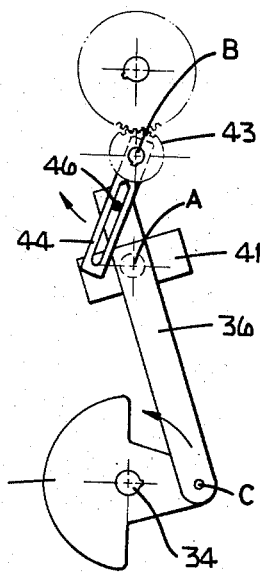
FIG. 11 is identical to FIG. 10 but illustrates a position of the driving crank assumed subsequent to its position of FIG. 10.

Referring again to FIG. 4, it will be noted that a connecting rod and driven member assembly extends generally downwardly from the crank 32 and elements of this counterpart structure, duplicating that already described, are given corresponding reference numerals but with the suffix a (this duplicate structure is omitted from FIGS. 9, 10 and 11). The connecting rod 36a extends from the pivot axis and because the rods 36 and 36a are displaced generally 180° from each other, the dwell intervals 52a and 53a of the gear 31a are displaced 90° out of phase with relation to dwell intervals 52 and 53, respectively, of the gear 31.

This additional, duplicating structure may be utilized for providing the motion required for the parallel or vertical portion of the winding head path. Such motion can be transmitted through gear 31a and pin 27a with pin 27a extending directly into the slot 21 in member 16 (FIG. 2), or gear 31a may be connected through a shaft to member 22 as shown schematically in FIG. 2. Because of the out-of-phase relation, referred to above, between the dwell intervals for gear 31 with relation to those of gear 31a, the vertical stroke of the winding head will occur during a dwell interval for the horizontal drive, and the horizontal or angular motion of the winding head will occur during a dwell interval of the vertical drive. The winding head will thus trace the relatively rectangular path the upper half of which is illustrated in FIG. 3.

FIGS. 7 and 8 illustrate a practical embodiment of the structure shown schematically in FIG. 4. As may be seen in FIG. 7 a stationary frame member 61 supports on bearing 62 the member 63 which defines the intermediate pivot for connecting rod 64 which extends through and can slide within the slot 66 in member 63. The member 63 is the counterpart of member 41a of FIG. 4, member 61 is the counterpart of support surface 42a of FIG. 4 and connecting rod 64 is the counterpart of rod 36a of FIG. 4. The rod 64 is pivotally joined at 67 to crank 69 which is the counterpart of crank member 32 of FIG. 4. The crank 69 is driven by the power input shaft 70 which corresponds to shaft 34 of FIG. 4. A roller 71 extends from rod 64 into slot 72 in the member 73 which is integral with the shaft 76 supported for rotation by bearings 77. The extending end of shaft 76 carries a gear 75 which meshes with an adjacent gear 78, the gears being sized so that the drive ratio between them is two to one, the driving gear 75 moving through two complete rotations for each single rotation of gear 78. Gear 78 rotates shaft 79 which is supported by bearings 81. The shaft 79 extends to rotate a crank member (not shown), comparable to the crank 22 of FIG. 2, having a Scotch-yoke type linkage, with a guide rod supported head, comparable to head 16 of FIG. 2, which functions to vertically move a shaft (identified at 100 in FIG. 8). It will be evident that gears 77 and 78 are counterparts of gears 43a and 31a, respectively, of FIG. 4, and that slotted member 73 is the counterpart of member 44a of FIG. 4. The structure described with reference to FIG. 7 provides the vertical stroke motion of the winding head.

Referring to FIG. 8, member 81 is supported for angular motion by bearings 82 on the upper extension of the stationary member 61, referred to previously in describing FIG. 7. The member 81 slidably receives the connecting rod 83 and thus establishes an intermediate pivot axis for the rod 83, the member 81 being the counterpart of member 41 of FIG. 4 and connecting rod 83 being the counterpart of rod 36 of FIG. 4. The rod 83 is pivotally joined to crank 69 at 67 adjacent the crank arm 64. The roller 84, extending from rod 83, rides in slot 86 in member 87. This slotted member 87 is the counterpart of member 44 of FIG. 4 and functions to rotate shaft 88 which is supported by bearings 89 and has keyed to it a gear 91. The gear 91 meshes with gear 92 which, when rotated, drives the shaft 93. Gears 91 and 92 have a two to one drive ratio and are counterparts of gears 43 and 31 of FIG. 4. Shaft 93 carries, at its outer end, a crank member 94, which, in turn, carries an adjustably positionable roller 96. The roller 96 extends into a vertical slot 95 in a rack 97, the rack having an extending portion 98. Teeth 98a on rack portion 98 meshes with a splined pinion gear 99. The pinion gear 99 is supported by stationary members 90 but is free to rotate in bearings 90a. Gear 99 is provided with internal splines which mesh with external, vertical splines on the shaft 100 so that the shaft is rotated with gear 99 but is free to move vertically with relation to the gear. The shaft 100 at its upper end supports a winding head (not shown) and is moved vertically by the rotation of shaft 79 of FIG. 7, as previously pointed out. Rack member 97 is the counterpart of rack 26 of FIG. 2 and pinion gear 99 corresponds to gear 24 of FIG. 2. Shaft 100 of FIG. 8 is the counterpart of shaft 13 of FIG. 2. It will be evident that, by means of the mechanism shown in FIGS. 7 and 8, uniform rotation of the drive shaft 70 will produce the angular or transverse oscillating and the vertical stroke motions of the winding head, moving the head in a path referred to with reference to FIG. 3.

Figure 5:
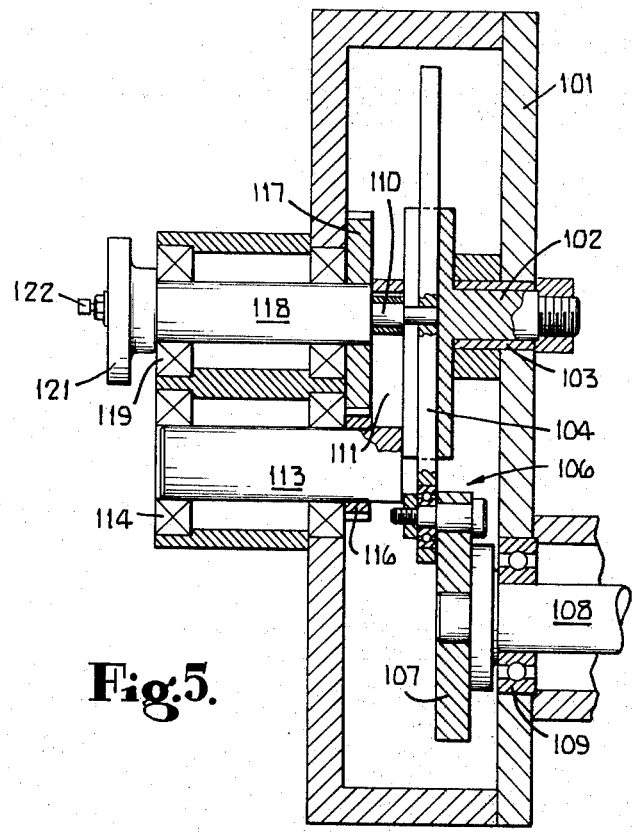
FIG. 5 is a side sectional view illustrating a modified form of the apparatus shown in FIG. 4.
Figure 6:
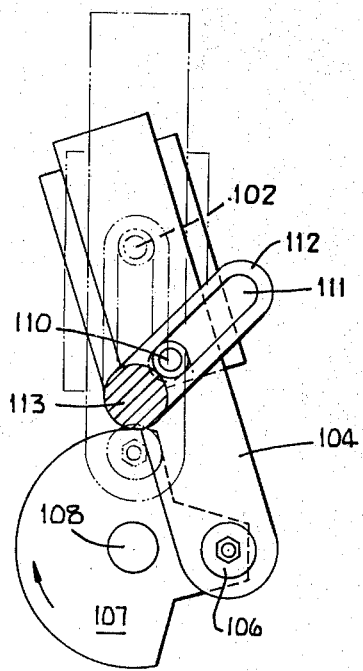
FIG. 6 is a front view of a portion of the apparatus shown in FIG. 5.

Referring to FIGS. 5 and 6, there is shown a slightly modified form of the upper portion of the structure shown in FIG. 4. In FIG. 5 reference numeral 101 identifies a stationary support which carries the member 102 which is free to move angularly within the bearing 103. The member 102 (the counterpart of member 41 of FIG. 4) slidably receives the connecting rod 104 which is pivotally attached at 106 to the crank member 107. Crank member 107 (the counterpart of crank 32 of FIG. 4) is rotated by drive shaft 108 journalled by bearing 109 on the member 101. A roller 110 extending from and carried solely by the rod 104 can slide within the longitudinal slot 111 in the arm 112. Arm 112 is integral with shaft 113 supported for rotation by bearings 114. The shaft carries a gear 116 which meshes with a driven gear 117, a two to one drive ratio existing between the gears 116 and 117. Gear 117 rotates shaft 118, supported by bearings 119, and the shaft 118 carries a driven member 121 having an element 122 which is adapted to ride in a rack slot comparable to slot 28 of the rack 26 of FIG. 2.

It will be evident that slotted arm 112 is the counterpart of arm 44 of FIG. 4 and gears 116 and 117 correspond to gears 43 and 31 of FIG. 4. The structure of FIG. 5 differs from that of FIG. 4 in that, as may best be seen in FIG. 6, the pivot axis 110 joining the connecting rod 104 and arm 112 is located between pivotal connection 16 and intermediate pivot 102 whereas in the structure of FIG. 4 the pivot axis 46 is above or outboard of the pivot axis A. In FIG. 6 the crank 107 is shown in solid lines rotated 90° from its position of FIG. 5, the position of the components shown in broken lines in FIG. 6 corresponding to their position in FIG. 5. The modified form of the structure shown in FIGS. 5 and 6 operates identically to the arrangement shown in the upper portion of FIG. 4 but offers the advantage that the mechanism can be more compactly arranged.

The motion conversion mechanism of the present invention is particularly adapted for incorporation in a stator winding apparatus. When the winding apparatus is deenergized or halted, at the end of an operation, this will occur at the end of its stroke and during a dwell interval of the motion conversion mechanism. During a dwell interval, the angular relation of arm 44 and rod 36 (FIG. 4) is such that the mechanism is locked and the apparatus cannot be moved by manually or otherwise rotating gear 31, that is, shaft 34 (FIG. 4) cannot be moved by applying power reversely through the linkage. This locking feature has important safety advantages and also aids in establishing a predetermined reference position which, for example, facilitates cutting of uniform length leads at the end of a winding operation. The mechanism is wear resistant and its components can be of relatively low mass and thus particularly suitable for high speed operation. Use of the mechanism as the drive means for the angular motion of the winding head, moving it through the transverse portion of its path, eliminates the use of a barrel cam which is characteristic of prior art structures. By altering the dimensions of such components as the length of the crank arm and the distance between the pivotal axes of the components of the mechanism, various length of dwell interval and number of dwell intervals can be obtained.

I claim:

1. An apparatus for converting continuous, uniform velocity, rotary motion into intermittent, non-uniform velocity, rotary motion comprising: a drive member adapted to be moved at uniform velocity through a circular path, a connecting rod having a pivotal connection to said drive member adjacent one of the rod ends, means establishing an intermediate pivot axis for said rod which permits relative motion of said rod and said intermediate pivot axis but with the longitudinal axis of the rod being required to pass through said intermediate pivot axis at all positions of the rod, a driven member supported for angular motion about a pivot axis, an operative connection between said driven member and said connecting rod permitting both angular and linear relative movement therebetween, whereby upon uniform rotation of said drive member, said driven member is angularly moved about its said pivot axis cyclically with each complete revolution of said drive member through a substantially stationary dwell and a maximum angular velocity with said dwell occuring upon alternate rectilinear alignments of the three points defined by the axis of said connecting rod to drive member pivotal connection, said intermediate pivot axis for the connecting rod, and the axis of angular movement between said connecting rod and driven member.

2. An apparatus as claimed in claim 1 in which said operative connection between said driven member and said connecting rod takes the form of an elongated slot and a cooperating abutment movable along the length of the slot.

3. An apparatus as claimed in claim 1 in which said means for establishing an intermediate pivot axis for the connecting rod takes the form of a member supported for angular motion and adapted to accommodate movement of said connecting rod parallel to the longitudinal axis of the rod.

4. An apparatus as claimed in 1 in which said driven member is adapted to rotate an intermediate element about said driven member pivot axis, an output member mounted for rotation and having a 1 to $n$ motion transmission connection to said intermediate element, whereby said output member is driven at an angular velocity equal to the angular velocity of said driven member divided by $n$, and in each complete revolution exhibits $n$ number of substantially stationary dwells.

5. An apparatus as claimed in claim 4 in which said intermediate element and said output member take the form of meshing gears and $n = 2$.

6. An apparatus as claimed in claim 1 in which an additional connecting rod is pivotally connected to said drive member at the same pivotal axis as said first mentioned connecting rod, means establishing an intermediate pivot axis for said additional connecting rod, and a driven member having an operative connection to said additional connecting rod.

7. In a stator winding apparatus of the type in which a winding head moves relative to a slotted stator in a path sequentially parallel to and transverse to the axis of the stator bore in placing a winding between two angularly separated stator slots: means for driving said winding head through the transverse portion of its path including a uniformly rotating drive shaft, a drive crank rotated by said drive shaft, a connecting rod pivotally attached to said crank, means for establishing an intermediate pivot axis for said rod which permits relative motion of said rod and said intermediate pivot axis but with the longitudinal axis of the rod being required to pass through said intermediate pivot axis at all positions of the rod, a driven member supported for angular motion about a pivot axis, and an operative connection between said driven member and said connecting rod permitting both angular and linear relative movement therebetween, whereby upon each revolution of said drive crank said driven member moves through a dwell interval, motion transmission means extending between said driven member and the winding head for moving the winding head through the transverse portion of its path as said driven member moves between its dwell intervals, and means operated by said drive shaft for driving the winding head through said parallel portion of its path during the dwell intervals of said driven member.

8. A stator winding apparatus as claimed in claim 7 in which said pivotal attachment of the drive crank and connecting rod is positionally adjustable to vary the throw of said crank.

9. A stator winding apparatus as claimed in claim 7 in which said operative connection between said driven member and said connecting rod takes the form of an elongated slot and a cooperating abutment movable along the length of the slot.

10. A stator winding apparatus as claimed in claim 7 in which said means for establishing an intermediate pivot axis for the connecting rod takes the form of a member supported for angular motion and adapted to accommodate movement of said connecting rod parallel to the longitudinal axis of the rod.

11. A stator winding apparatus as claimed in claim 7 in which said means operated by said drive shaft for driving the winding head through the parallel portion of its path includes an additional connecting rod pivotally attached to said crank on the same pivotal axis as said first mentioned connecting rod and extending in opposite direction from the direction of extension of said first mentioned connecting rod, means for establishing an intermediate pivot axis for said additional rod, a further driven member operatively connected to said additional rod, and motion transmission means connecting said further driven member and said winding head, whereby said winding head is moved sequentially through its parallel and transverse path portions as said first mentioned driven member and said further driven member move, respectively, through their dwell intervals.

12. A stator winding apparatus as claimed in claim 7 in which said driven member is adapted to rotate an intermediate element about said driven member pivot axis, an output member mounted for rotation by said intermediate element at a one to two ratio to thereby cause said output member to move at an angular velocity one-half that of said driven member and to exhibit two dwell intervals with each complete revolution.

13. A stator winding apparatus as claimed in claim 12 in which said intermediate element and said output member take the form of meshing gears.

14. A stator winding apparatus as claimed in claim 12 in which the rotational axis of said drive crank, said intermediate pivot axis of said connecting rod and said driven member pivot axis are all rectilinearly aligned.

15. A stator winding apparatus as claimed in claim 12 in which the axis of said operative connection between said driven member and said connecting rod passes through a position in alignment with said intermediate pivot axis of said connecting rod with each complete rotation of said driven member.

* * * * *